(12) United States Patent
Tomioka et al.

(10) Patent No.: US 8,215,004 B2
(45) Date of Patent: Jul. 10, 2012

(54) FABRICATION LINE

(75) Inventors: Masanori Tomioka, Toyokawa (JP); Tomohisa Nakamura, Toyokawa (JP); Susumu Fujita, Toyokawa (JP); Takanobu Tozaki, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 1170 days.

(21) Appl. No.: 12/038,036

(22) Filed: Feb. 27, 2008

(65) Prior Publication Data
US 2009/0031560 A1 Feb. 5, 2009

(30) Foreign Application Priority Data
Jul. 30, 2007 (JP) ................. 2007-197654

(51) Int. Cl.
*B23P 21/00* (2006.01)
*B23Q 7/00* (2006.01)
*B23Q 3/00* (2006.01)

(52) U.S. Cl. ............... 29/709; 29/712; 29/714; 29/822; 29/823; 29/824; 29/559; 269/55; 269/58; 269/289 R; 269/905

(58) Field of Classification Search ............ 29/431, 29/709, 712, 714, 799, 822, 823, 824, 281.1, 29/281.3, 559; 269/50, 55, 58, 60, 71, 73, 269/95, 111, 152, 289 R, 905
See application file for complete search history.

(56) References Cited

U.S. PATENT DOCUMENTS

| | | | |
|---|---|---|---|
| 2,161,578 A * | 6/1939 | Johnson | 108/106 |
| 3,524,556 A * | 8/1970 | Miller | 414/589 |
| 5,044,541 A * | 9/1991 | Sekine et al. | 228/6.1 |
| 5,747,894 A | 5/1998 | Hirai et al. | |
| 6,202,296 B1 * | 3/2001 | Tatsuda et al. | 29/784 |
| 6,546,616 B2 * | 4/2003 | Radowick | 29/720 |

FOREIGN PATENT DOCUMENTS

| | | |
|---|---|---|
| JP | 2-47137 | 3/1990 |
| JP | 7-40168 | 2/1995 |
| JP | 7-249531 | 9/1995 |
| JP | 7-271437 | 10/1995 |
| JP | 2001-150252 | 6/2001 |
| JP | 2002-263974 | 9/2002 |

* cited by examiner

*Primary Examiner* — Jermie Cozart
(74) *Attorney, Agent, or Firm* — Finnegan, Henderson, Farabow, Garrett & Dunner, L.L.P.

(57) ABSTRACT

A fabrication line that utilizes a jig pallet that is commonly used in processing equipment to efficiently finish and assemble semifinished products of plural shapes. The jig pallet includes a holding member D for holding a semifinished product W and an opening/closing device G1 for opening and closing the holding member D, and allows the semifinished product W to be mounted and dismounted by opening and closing the holding member D with the opening/closing device G1. The jig pallet is transported to processing equipment M1, M2, and M3 to allow the semifinished product to be processed in the fabrication line. An opening/closing driving device G2 that engages the opening/closing device G1 to open and close the holding member is provided along the fabrication line.

14 Claims, 9 Drawing Sheets

FABRICATION LINE

TECHNICAL FIELD

The present invention relates to a fabrication line, and specifically to one such as an automatic one for door trims assembling.

BACKGROUND ART

A door trim for an automobile, for example, typically consists of an upper door trim, a lower door trim, and the like. The upper door trim may be a laminated structure having a plastic core and a surface film adhered on it. The lower door trim may be an injection-molded plastic. To form a joint for the upper door trim and the lower door trim, a semifinished or semi-assembled product is used. The semifinished product is prepared by inserting bosses for welding, which are vertically arranged with appropriate intervals along the lower door trim edge, into mounting holes formed in the upper door trim. The semifinished product is set in an ultrasonic welding and caulking equipment. Then welding (ultrasonic welding and caulking) is performed by closing a clamping device to join the upper door trim and the lower door trim (see JP-A-2004-224012).

When performing the ultrasonic welding as described above, a gap between the boss for welding and the periphery of the mounting hole may cause a gap between the upper door trim and the lower door trim, to thereby lessen their contact. Therefore, during the ultrasonic welding, the area near the welding should be held tightly. In an assembly line (fabrication line), various processes such as bending a pawl for a weather strip, retainer-inserting, and screwing, as well as ultrasonic welding, are performed by respective equipment.

A supporting jig for a semifinished product inside the ultrasonic welding and caulking equipment, the pawl-bending equipment, the retainer-inserting equipment, and the like, in the traditional assembly line has a special part for each joint of each respective process. A holder of the supporting jig for the joint part may also be formed in accordance with the number of joints to be processed by each equipment.

Since each equipment uses a respective jig and a holder, a supporting jig for one equipment cannot be used by another equipment, and a machine for the transportation of the semifinished product between processing equipment is required. Therefore, there are problems, such as difficulties in improving productivity and increased assembling costs. The increased assembling cost of each equipment is also a problem, because of a need for making a respective supporting jig for each product.

Although a traveling carriage can be used for positioning a work on a support and for clamping it there, a traditional traveling carriage is heavy, because a clamping means is mounted on it. Thus, the difficulty in using such a carriage in an assembly line is a problem.

DISCLOSURE OF INVENTION

The present invention has been made to solve the above problems. It is, therefore, an object to provide a fabrication line that can effectively carry out the post-process and assembly of semifinished products with plural shapes using a jig pallet that can be commonly used in processing equipment of a fabrication line and that is versatile.

The fabrication line of the present invention is one where a jig pallet is transported to a processing equipment to perform a predetermined process on a semifinished product. The jig pallet comprises a holding member for holding the semifinished product and an opening/closing device for opening and closing the holding member. The semifinished product can be mounted on and dismounted from the jig pallet by opening and closing the holding member by means of the opening/closing device. The fabrication line is characterized in that an opening/closing driving device that engages the opening/closing device to drive the holding member to open and close is provided along the fabrication line.

By this invention, since the opening/closing driving device is arranged along the fabrication line, which driving device engages with the opening/closing device of the jig pallet to drive the holding member to open and close, no power source or its instrument for driving them need be carried. Thus a lighter jig pallet can be attained inexpensively. In addition, since the post-process and assembly of semifinished products with a plurality of shapes can be effectively carried out, a fabrication line with an increased line speed can be provided.

The basic Japanese Patent Application, No. 2007-197654, filed Jul. 30, 2007, is hereby incorporated in its entirety by reference in the present application.

The present invention will become more fully understood from the detailed description given below. However, the detailed description and the specific embodiment are illustrations of desired embodiments of the present invention, and are described only as an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the invention, and so does not limit the scope of the invention, unless otherwise stated.

BEST MODE FOR CARRYING OUT THE INVENTION

The fabrication line of the present invention is usable as one that moves a jig pallet carrying a semifinished product to various processing equipment where a predetermined process is carried out on the semifinished product. The processing equipment include, for example, an ultrasonic welding and caulking equipment, a weather-strip-pawl-bending equipment, a clip-inserting equipment, a screw-clamping equipment, and a hot melt adhesion equipment. The term "semifinished product" is a generic term for automobile interior parts of which the processing is not completed. It includes, for example, an upper door trim, a lower door trim, an armrest, a pocket, an ornament, a weather strip, and a speaker grill. Some processing sections (working sections) of these processing equipment have to hold an area near a section for processing to fix the semifinished product during welding and caulking, pawl-bending, clip-inserting, and the like, to prevent the product from rising up and from moving to cause a gap or misalignment between the parts to be bonded or inserted. The area near a section for processing includes not only a bonding area such as a welding and caulking area, a screw-clamping area, and a clip-inserting area, but also an area to be held to prevent a product from rising up and from moving to cause a gap during pawl-bending, and the like.

Figure 1:
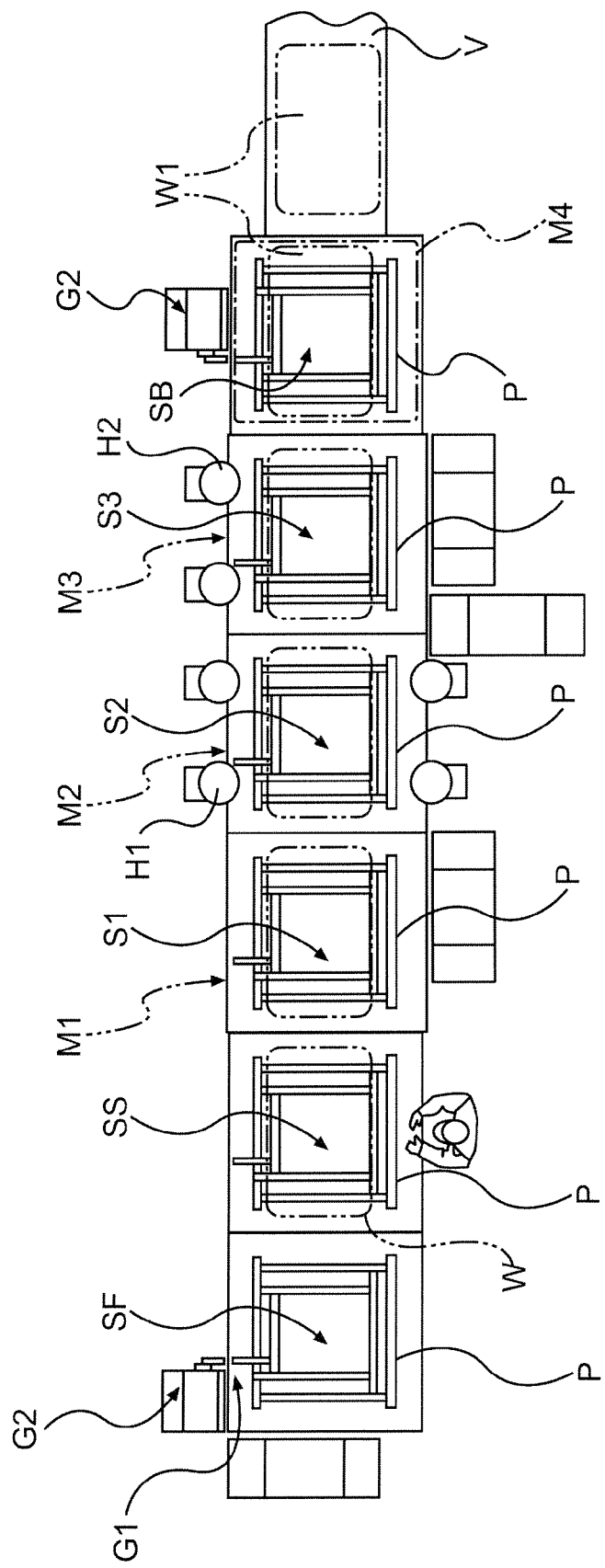
FIG. 1 is a schematic view of a assembly line of one embodiment of the present invention.
Figure 2:
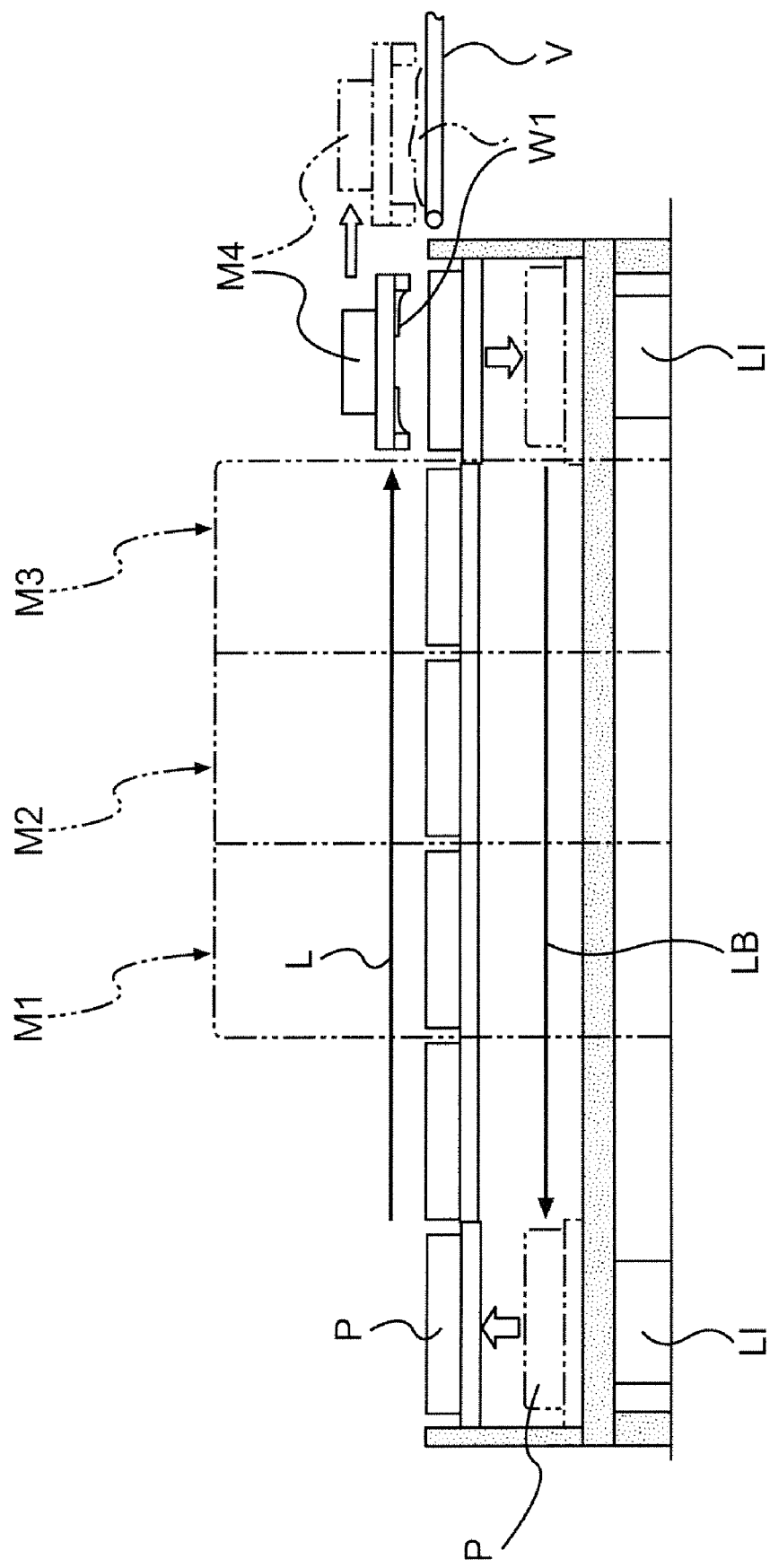
FIG. 2 is a side view of the assembly line of FIG. 1.

The fabrication line of the present invention is described below with reference to the appended drawings. As shown in FIGS. 1 and 2, the assembly line (fabrication line) of one embodiment of the present invention is arranged to move a jig pallet P carrying a semifinished product W to an ultrasonic welding and caulking equipment M1 having an ultrasonic welding station S1, to a screw-clamping equipment M2 having a screw-clamping station S2, and to a clip-inserting equipment M3 having a clip-placing and inserting station S3. In the present invention, a weather-strip-pawl-bending equipment having a weather-strip-pawl-bending station may be provided before (at the upstream side of the clip-inserting equipment M3. In FIG. 1, the symbols "H1" and "H2" indicate part-feeders for screws and for clips, respectively.

In the embodiment, a feeding station SF for feeding the jig pallet P is provided at the upstream portion of the assembly line. A return station SB, to which the jig pallet P is returned, is provided at the downstream portion of the assembly line. A semifinished product setting station SS for mounting the semifinished product W onto the jig pallet P is provided before the jig pallet P is fed from the feeding station SF to the processing equipment.

A semifinished product after the completion of the predetermined processes (finished product) W1 is returned to the return station SB. It is then transferred from the jig pallet P to a conveyer, which is located adjacent to the return station SB, by a removing equipment M4 located above the return station SB. In the embodiment, a returning path, which is shown as the return direction LB of the jig pallet P, is provided under the processing path, which is shown as the traveling direction L of the jig pallet P, so as to circulate the jig pallet P between the feeding station SF and the return station SB. A lift means, such as a lifting equipment L1, which may be provided under the feeding station SF and the return station SB, can be used to transfer the jig pallet P from the processing path to the returning path and vice versa. The lift means may comprise an electric (motor or thrust) cylinder, for example. The conveyor and the like are omitted in FIG. 2. It is also possible to not provide the returning path to circulate the jig pallets P, but to utilize a batch process where the jig pallets P, stored in the feeding station SF, are fed to the processing path one-by-one, returned to the return station SB at the downstream portion of the processing path, and then carried back to the feeding station SF on a batch basis.

Figure 3:
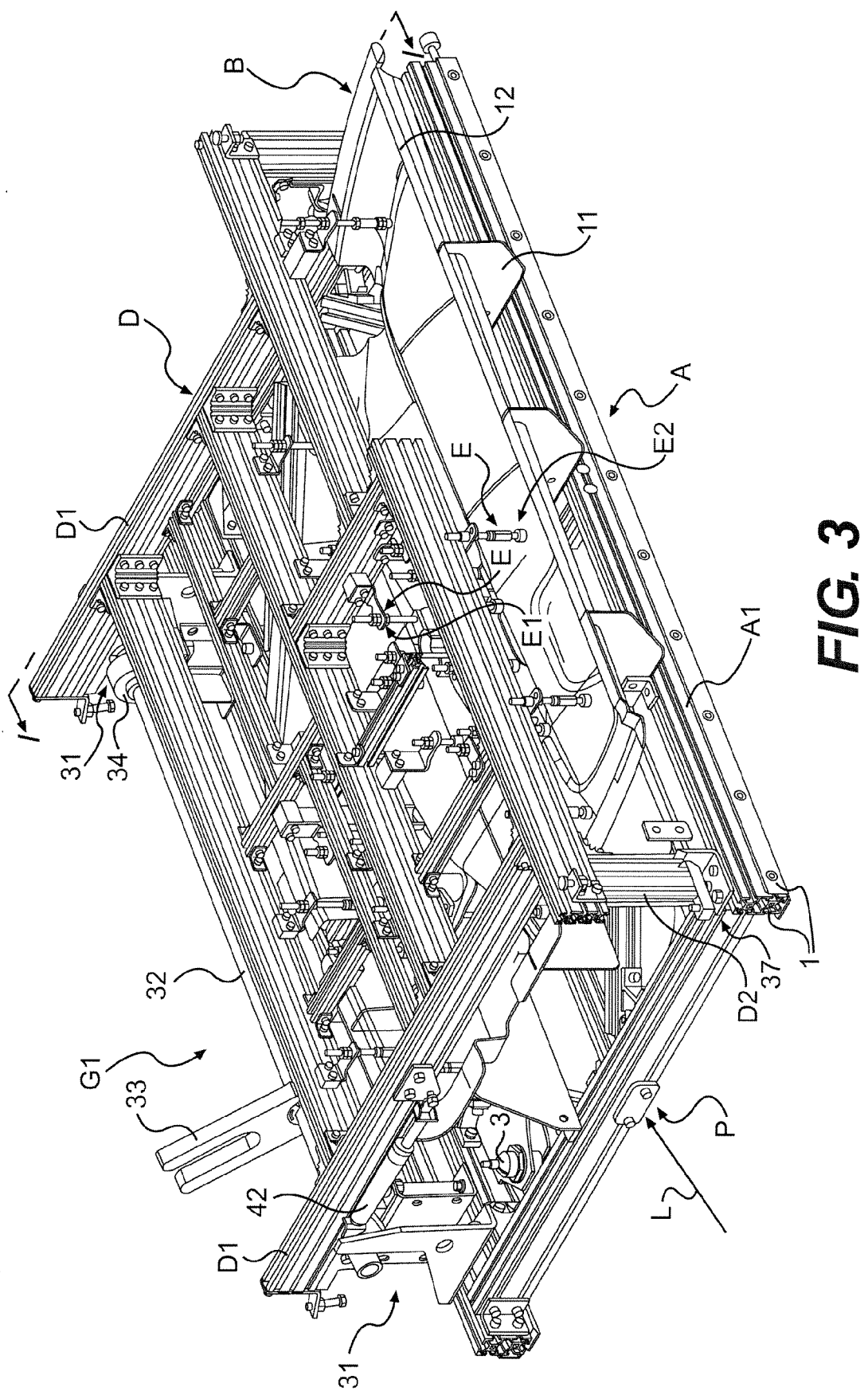
FIG. 3 is a perspective view of a jig pallet to be applied to the assembly line of the embodiment of the present invention.

The jig pallet P may comprise a carriage member A, a semifinished product supporting member B located on the carriage member A, a holding member D facing an area C near a section for processing (FIG. 9) of a semifinished product W placed on the semifinished product supporting member B and having a holding means E to hold the area C from above, and an opening/closing device G1 located at one end of the carriage member A, as shown in FIG. 3.

In the embodiment, opening/closing driving devices G2, which engage the opening/closing device G1 to drive the holding member D to open and close, are located near the feeding station SF and near the return station SB along the assembly line to reduce the weight of the jig pallet P. But the opening/closing driving devices G2 can be located at the semifinished product setting station SS and at the return station SB. The wording "to drive the holding member D to open and close" means to open and close the holding member D with respect to the supporting member B or the semifinished product W mounted on the supporting member B by moving the holding member D upward and downward with respect to the supporting member B, or by pivoting the holding member D with respect to the supporting member B.

As shown in FIGS. 3-6 and 8, the opening/closing device G1 comprises a turning shaft 32 rotatably supported by a bearing support 31, which is located under a frame D1 of the holding member D, a group of bearings located in the carriage member A and rotatably supporting the turning shaft 32, and an opening/closing lever 33 fixed to the turning shaft 32. The frame D1 consists of members that are facing each other and orthogonal to the traveling direction L. Three pillow block bearing units, one located at each end of the turning shaft 32 and one located at the side of the opening/closing lever 33, are used as the group of bearings.

Figure 8:
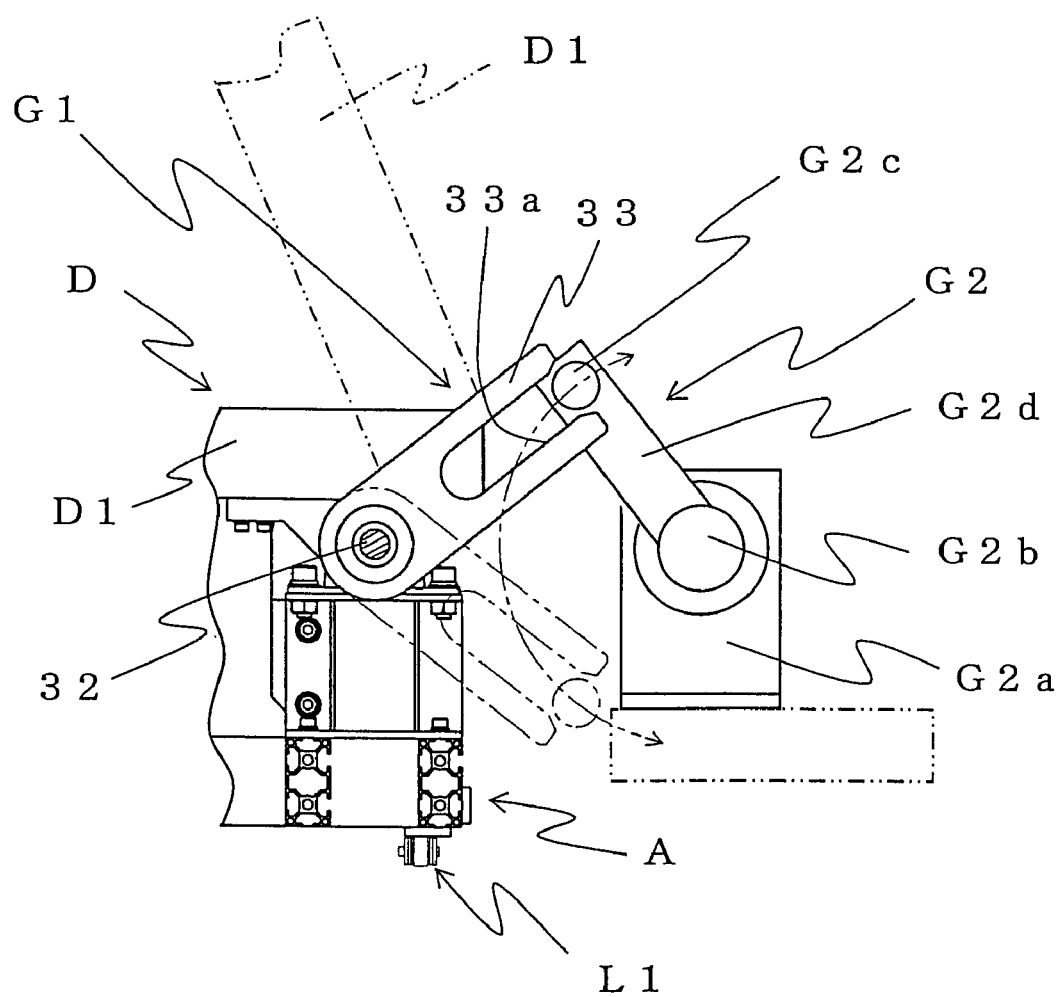
FIG. 8 illustrates a turning motion of the holding member of the jig pallet of FIG. 3.

In the embodiment, the opening/closing driving device G2 comprises a drive motor (which may include a set of reduction gears) G2a and a swinging arm G2d, as shown in FIG. 8. The arm G2d has an engaging member G2c to be fixed to a swinging shaft G2b of the drive motor G2a. But the invention is not limited to this contents. When the engaging member G2c of the opening/closing driving device G2 swings, it drives the holding member D to open and close as it engages a notch 33a of the opening/closing lever 33. The opening/closing driving device G2 can be engaged with the holding member D by using any well-known method, and is not limited to that in the embodiment.

All that is required for the jig pallet P in the present invention is that it be provided with the holding member D for holding the semifinished product W and the opening/closing device G1 for opening and closing the holding member D and that it allow the semifinished product W to be mounted on it and be removed from it by opening and closing the holding member D by means of the opening/closing device G1. Thus, it is not specifically limited. Below the jig pallet P of the embodiment is described in detail.

First, the carriage member A is configured as a framed structure, which is latticed with frame members. Each is made from two aluminum grooved square timbers piled vertically to reduce the weight. The jig pallet P of the embodiment is mounted on and carried by a pair of carrying chains L1. They are located at a certain interval along the traveling direction L of the assembly line. Respective wear-resistant guide members 1 are, for example, fixed on both a bottom surface and a side surface of a bilateral frame A1 of the carriage member A.

A semifinished product detecting means 2, for sensing the semifinished product W mounted on the semifinished product supporting member B, is fixed to a central frame A2 of the carriage member A. A sensor 2a of the semifinished product detecting means 2 passes through a fractionally cutout part of the semifinished product supporting member B. The sensor 2a can detect the semifinished product W mounted on the semifinished product supporting member B by either contact or non-contact. In the embodiment a contact sensor is used, but the invention is not limited to this.

Figure 4:
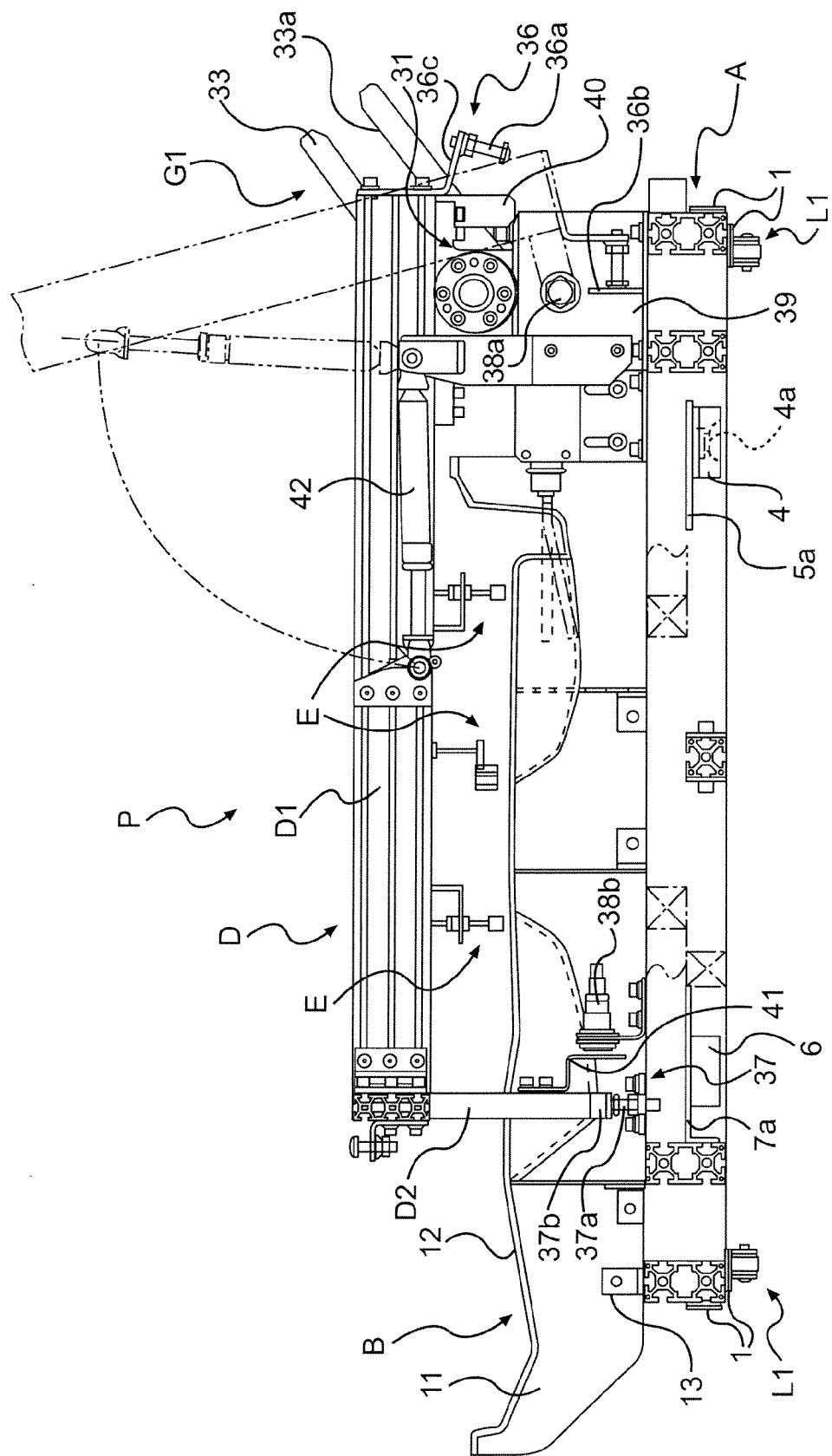
FIG. 4 is an section view along line I-I of the jig pallet of FIG. 3, where a portion of the jig pallet is omitted.
Figure 5:
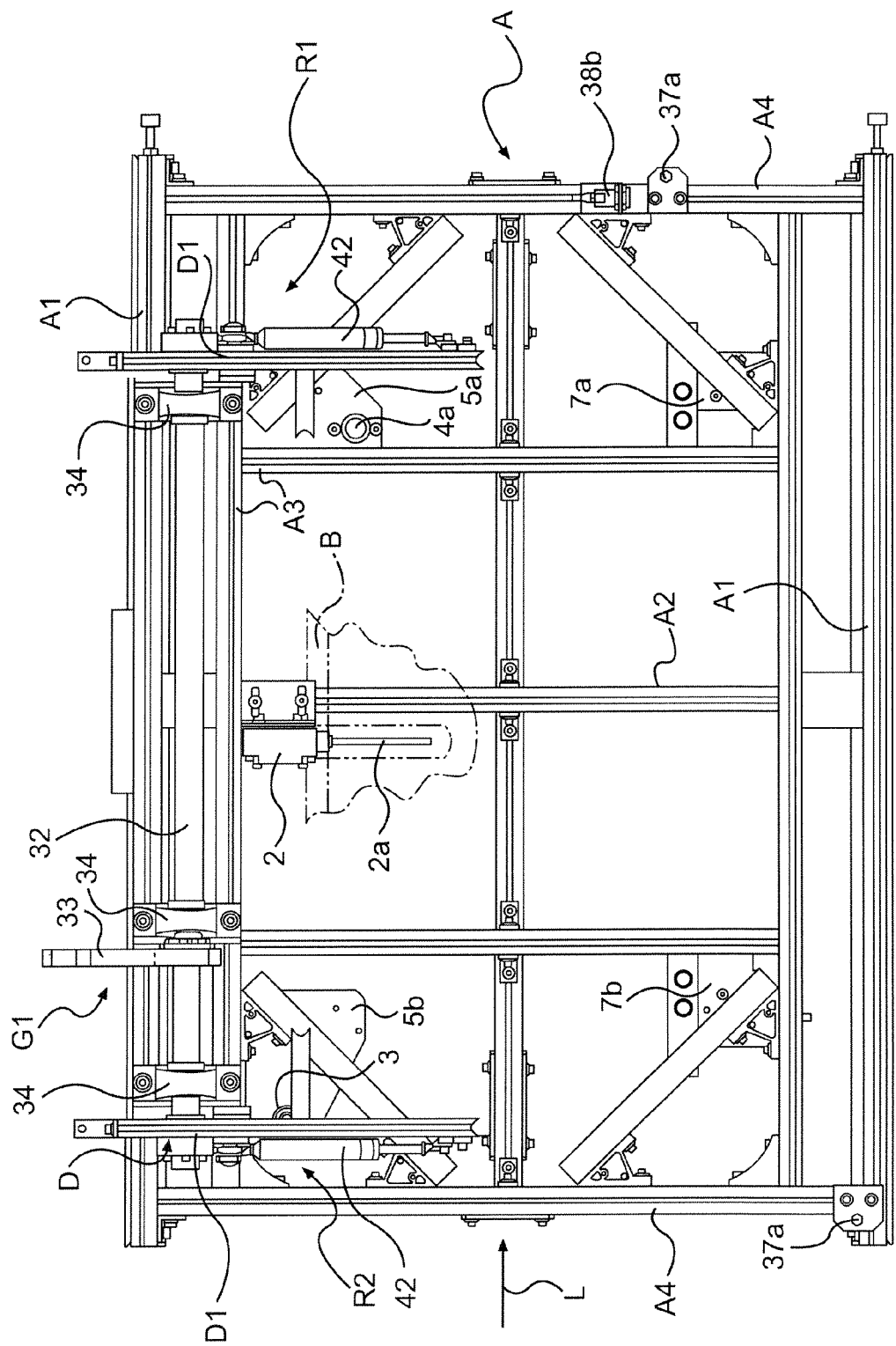
FIG. 5 is a plan view of the jig pallet of FIG. 3, where a portion of its supporting member for a semifinished product and a portion of its holding member are cut off.

The carriage member A is provided with a pallet-detecting member 3 and a positioning member 4 at a corner R1 and a corner R2 respectively. The corner R1 and the corner R2 are a pair of a forward corner and a backward corner of the four corners of the carriage member A in the traveling direction L, as shown in FIGS. 3-5. The pallet-detecting member 3 is a mark for sensing the jig pallet P, on a position in the assembly line for a certain processing equipment, by a detecting means (not shown) located in the assembly line. The positioning member 4 is to position the jig pallet P. In the embodiment, the pallet-detecting member 3 and the positioning member 4 are fixed to the inner frame A3 with L-shaped plates 5a and 5b. In FIG. 4, a side frame A4 and its neighboring members are omitted, to show the positioning member 4 clearly.

To position the jig pallet P, a detecting means (not shown), located at a given position of each processing equipment, senses the pallet-detecting member 3. Then the carrying chain L1 is stopped. Then a positioning pin (not shown), which is provided in the assembly line and is movable up and down, moves upward through a hole 4a formed in the positioning member 4 to position the jig pallet P.

In the embodiment, the pallet-detecting member 3 and the detecting means (not shown) send a signal indicating the detection of the jig pallet P to an assembling control (fabrication control) system (not shown) to control the positioning of the jig pallet P on the assembly line, resulting in controlling the assembling (process work or fabrication) of the semifinished product.

Supporting members 6 are provided at the four corners of the carriage member A. In the embodiment, one of the supporting members 6 is also used as the positioning member 4. The supporting members 6 are also fixed by means of L-shaped plates 5b, 7a, and 7b.

In the embodiment, the jig pallet P is lifted with the supporting members 6 (the positioning member 4), which are supported by lifting members (not shown) that are located at four respective positions of each equipment. Then the upper surface of the holding member D of the jig pallet P is pressed to a fixing member (not shown) that is located at an upper part of each equipment and that is facing the jig pallet P. After the jig pallet P is fixed, the work at each processing equipment is carried out.

The semifinished product supporting member B comprises legs 11 arranged in a grid pattern and a receiving section 12 fixed to them. The legs 11 are fixed to the carriage member A with a fixing means consisting of the L-shaped plate 13 and bolts (not shown). The legs 11 are formed in a grid using a metal plate or plastic. The receiving section 12 may be made by sticking a superficial material (a protective layer) on a fiber-reinforced plastic molding base material formed in the shape of the semifinished product W. Preferably, it may be made by applying a fluid polyurethane rubber on the surface of the fiber-reinforced plastic molding base material and by drying the polyurethane rubber, to improve productivity. Though the semifinished product supporting member is mainly made by shaping a plastic block and covering it with a protective layer, this method may have a disadvantage because of its heavier weight.

Like the carriage member A, to reduce the weight, the holding member D is configured as a framed structure. The framed structure is latticed with frame members made of three aluminum grooved square timbers piled vertically. The holding member D comprises a holding means E facing the area C near the section for processing the semifinished product W. The member D connects the opening/closing device G1 for opening and closing the holding member D at one end of the carriage member A.

Figure 6:
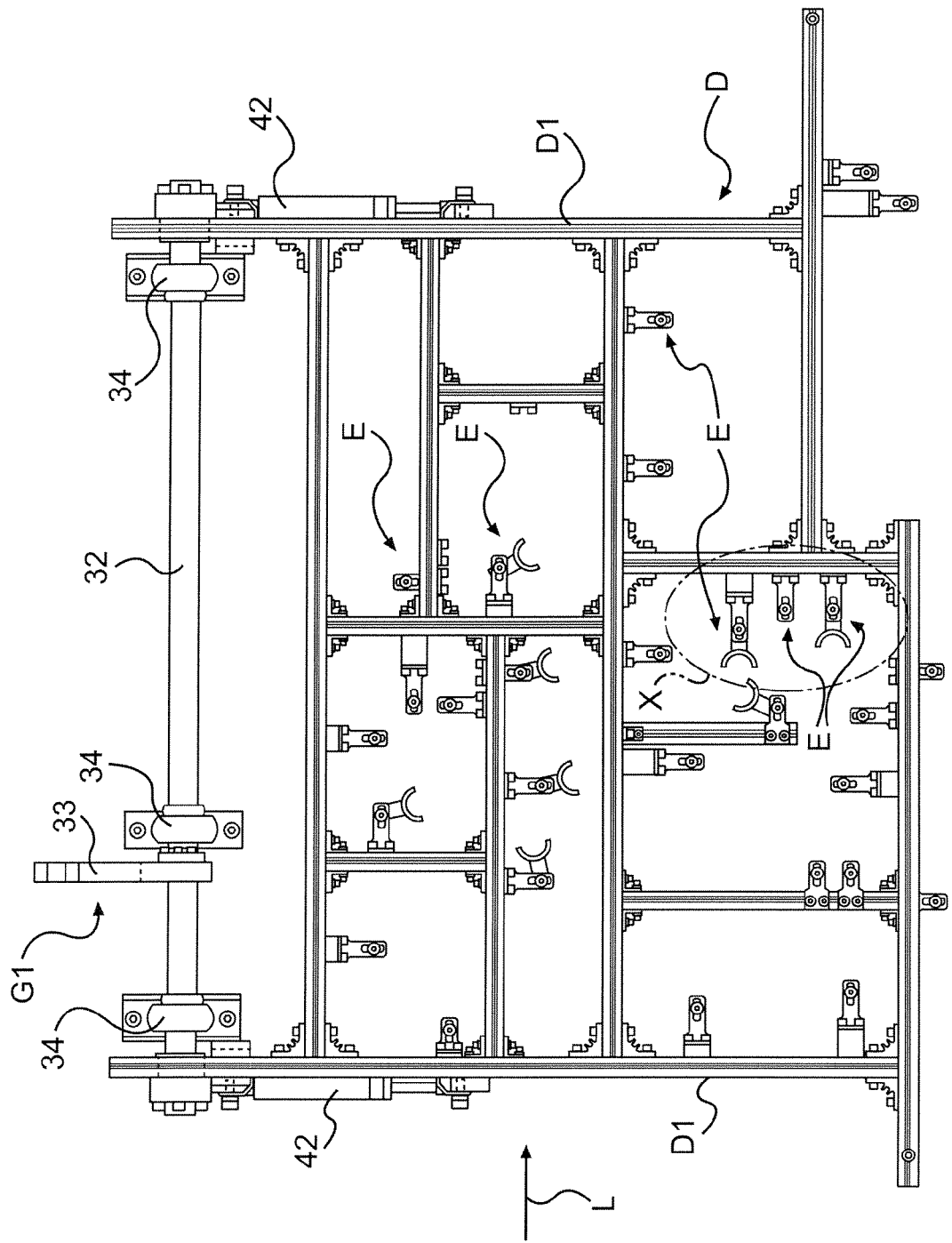
FIG. 6 is a plan view of the holding member of the jig pallet of FIG. 3.
Figure 7:
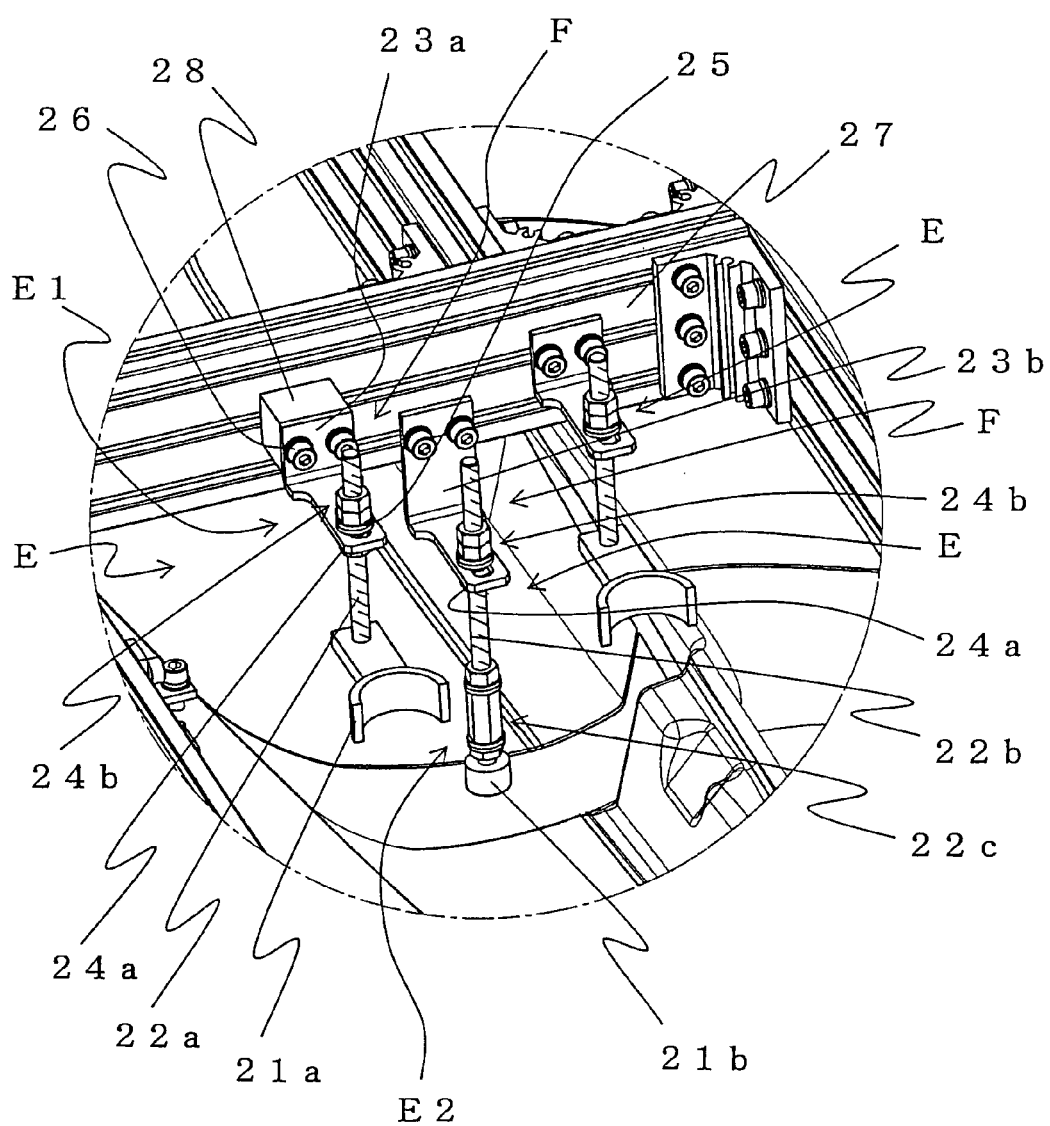
FIG. 7 is a perspective view of an ellipsoidal area X of the holding member of FIG. 6.

The holding means E comprises a holding rod for holding the area near the section for processing (see FIG. 9) and an adjuster F for adjusting the position of the holding means E vertically and horizontally, as shown in FIGS. 3, 6, and 7. The number and location of the holding means E depend on the number of and the position of each part of the semifinished product W to be processed by respective processing equipment. The holding rod is also shaped to hold the area near the section for processing while processing the semifinished product W. For example, the holding rod fixes the semifinished product W to prevent the upper door trim and the lower door trim from creating a gap between them. In the embodiment, the holding rod has two shapes. That is, a holding rod E1 has a shape that includes a holder 21a with an arc-shaped tip and an adjustable screw 22a extending vertically from the main body of the holder 21a. A holding rod E2 has a shape that includes a holder 21b with a cylindrical tip and an adjustable screw 22b extending vertically from the main body of the holder 21b. An additional nut 22c is provided to the adjustable screw 22b to prevent the holder 21b from moving when it presses the area near the section for processing.

Typically, when a boss for welding is welded and caulked by an ultrasonic horn having a circular outer shape, the holding rod E1, which has the holder 21a with the arc-shaped tip, is used to press the area C near the boss for welding along the outline of the ultrasonic horn. In contrast, the holding rod E2, which has the holder 21b with the cylindrical tip, is used to press the area near the section for processing C, which is a little distance away from a part to be processed, when the outer periphery of the boss for welding cannot be directly pressed because the part to be processed is at a cratering hollow of the semifinished product W.

To adjust the vertical position, the adjuster F comprises a nut 24a located under the L-shaped plates 23a, 24a and a pair of double-nuts 24b located on the plates 23a, 24a, which are among the nuts that are threadably mounted on the adjustable screws 22a, 22b, which are inserted through a hole in the horizontal part of the L-shaped plates 23a, 23b. The pair of double nuts 24b are mounted on the upper side of the L-shaped plates 23a, 23b, because the vertical adjustment of the holders 21a, 21b is easier from the upper side. The number "25" in FIG. 7 denotes a washer. The horizontal adjustment is achieved by moving the bolt 26 along a groove of a frame 27 and screwing it. The bolt 26 is inserted through a hole in the vertical part of the L-shaped plates 23a, 23b. In FIG. 7, the number "28" denotes an adjusting seat (spacer) for the horizontal adjustment in a direction that is at right angles to the above-mentioned horizontal direction.

A first stopper 36 and a second stopper 37 are provided for positioning the holding member D at the completion of its opening and closing. The first stopper 36 at the completion of the opening consists of a stopper pin 36a placed on a plate 36c fixed to the frame D1, and a stopper plate (backup plate) 36b placed on the carriage member A. The second stopper 37 at the completion of the closing consists of a stopper pin 37a placed on the carriage member A, and a stopper plate 37b placed on a bottom face of a supporting (legs) frame D2 of the holding member D.

In the embodiment, opening and closing detecting means are provided for sensing the opening and closing positions of the holding member D. The opening detecting means 38a is located inside a pedestal 39, which is located below the bearing support 31. The closing detecting means 38b is located on a side frame A4 of the carriage member A. The detecting means 38a detects a detecting member 40 placed on the side frame D1, and the detecting means 38b detects a flexed plate 41 placed on the supporting frame D2, to sense the opening and closing positions of the holding member D. Though the embodiment utilizes proximity switches for the detecting means 38a and 38b, the present invention is not limited to such a means.

The opening/closing device G1 is equipped with an opening/closing shock absorber 42 to maintain the opening state and the closing state of the holding member D. Therefore, the opening and closing positions of the holding member D cannot be shifted in a short time, such as when the holding member D is moving from one processing equipment to another, or when its linkage with the opening/closing driving device G2 is disconnected during the movement between the stations. Also, vibrations during transportation by the carrying chain L1 do not cause it to be shifted. Thus, the position of the holding member D can be maintained.

Figure 9:
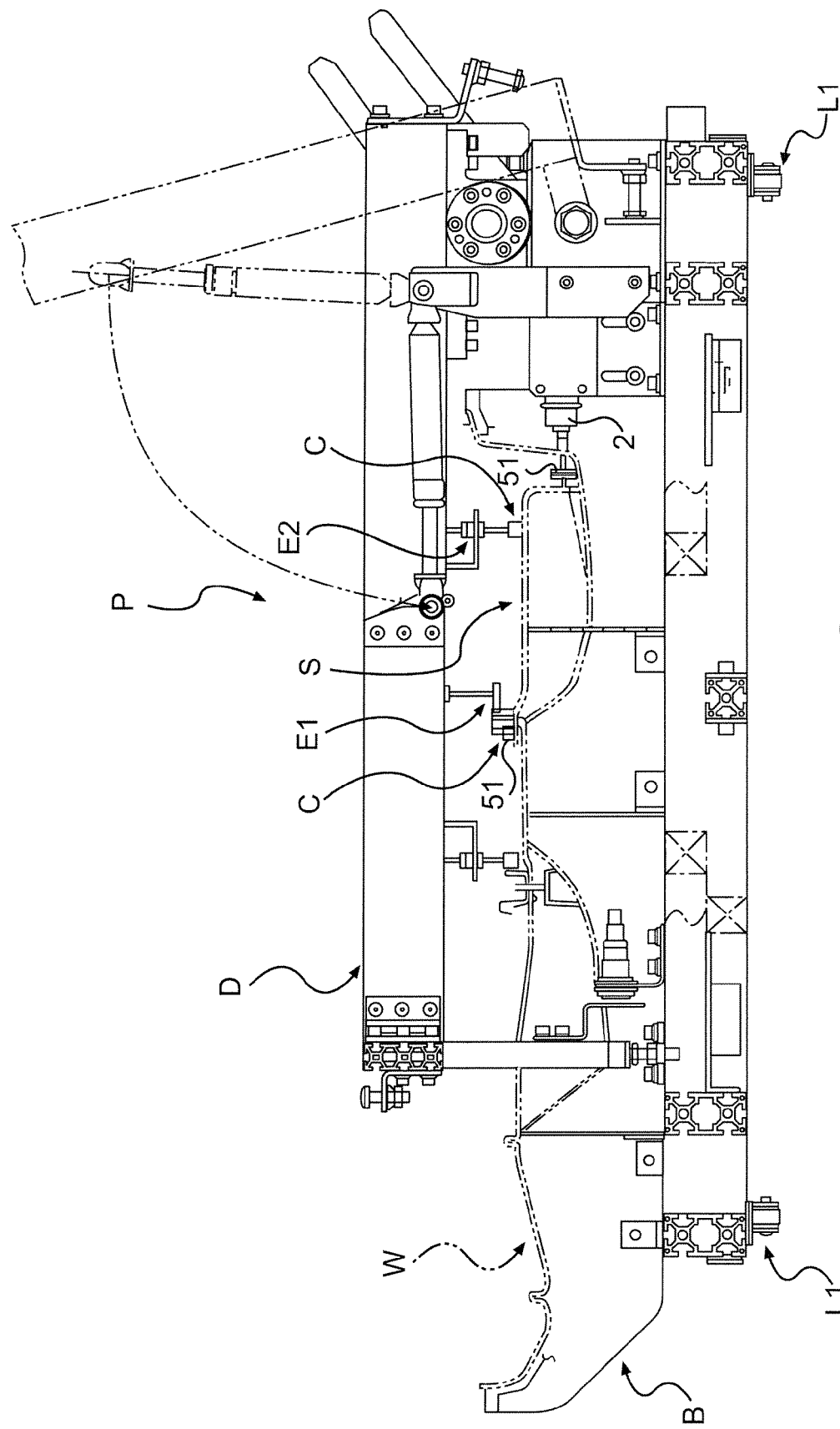
FIG. 9 illustrates a motion of the jig pallet of FIG. 3.

In the embodiment, the holding member D, which is equipped with the holding rods E1 and E2 of the holding means E, is opened as shown in FIG. 9. The holding means E has already been arranged to face the area C near the section to be processed by the processing equipment. Then the semifinished product W is mounted on the semifinished product supporting member B. For example, the semifinished product W is prepared, as a section for processing, by mating the boss 51 for welding and a hole of a part of a plastic door trim. At this time, the semifinished product W should be checked to see if it is set on the semifinished product supporting member B. This should be done by means of the contact sensor of the semifinished product detecting means 2. Then the holding member D is turned to press the area C near the section for processing by using the holding rods E1 and E2. Next, the carrying chain L1 is operated and the jig pallet P carrying the semifinished product W is transported to the front of the ultrasonic welding and caulking equipment M1 (see FIG. 1). Then the jig pallet P is detected by the pallet-detecting member 3, is positioned by the positioning member 4, and is fixedly supported at an elevated position. Then the welding and caulking process is achieved through ultrasonic-melting of the boss 51 for welding by the ultrasonic horn (not shown). After the welding and caulking process is finished, the jig pallet P is lowered to be carried by the carrying chain L1. Then it is transported to the screw-clamping equipment M2 and the clip-inserting equipment M3 (see FIG. 1) located downstream of the ultrasonic welding and caulking equipment M1. Then the subsequent process will be performed in turn.

Though the carriage member A and the holding member D are configured in framed structures in the embodiment to reduce the weight of the jig pallet P, another configuration can be used. To fit the holding means E on the holding member D, at least the holding member D is preferably configured as a framed structure.

The invention claimed is:

1. A fabrication line comprising a jig pallet, having a holding member for holding a semifinished product and an opening/closing device for opening and closing the holding member that allows a semifinished product to be mounted on and dismounted from the jig pallet by opening and closing the holding member with the opening/closing device, the jig pallet being transported to processing equipment in the fabrication line to perform a predetermined process on the semifinished product, and an opening/closing driving device that engages with the opening/closing device to open and close the holding member that is provided along the fabrication line,
   wherein the opening/closing driving device includes a driving motor and a swinging arm fixed to a turning shaft of the driving motor, the swinging arm having an engaging member that engages with the opening/closing device to open and close the holding member.

2. The fabrication line of claim 1,
   wherein a feeding station for transporting the jig pallet is provided at an upstream portion of the fabrication line, and a return station to which the jig pallet is returned is provided at a downstream portion of the fabrication line; and
   wherein an opening/closing driving device is located near the feeding station and near the return station.

3. The fabrication line of claim 2, wherein a semifinished product setting station for mounting the semifinished product onto a jig pallet is provided before the jig pallet is transported from the feeding station to the processing equipment.

4. The fabrication line of claim 2,
   wherein a return path for circulating the jig pallet between the return station and the feeding station is provided.

5. The fabrication line of claim 2,
   wherein removing equipment for removing a semifinished product, after completion of the predetermined process, from the jig pallet is provided above the return station.

6. The fabrication line of claim 1,
   wherein the jig pallet comprises a carriage member for carrying the holding member and the opening/closing device and a semifinished product supporting member located on the carriage member for carrying the semifinished product, the holding member facing an area near a section for processing and having a holding means to hold the area near a section for processing from above, the area near a section for processing being an area of the semifinished product mounted on the semifinished product supporting member and an area near a section to be processed by the processing equipment, and
   wherein the opening/closing device is located at an end of the carriage member.

7. The fabrication line of claim 6,
   wherein the holding member is a framed structure that is latticed with grooved bars.

8. The fabrication line of claim 6 or 7,
   wherein the holding member has an adjuster for adjusting a vertical and horizontal position of the holding means.

9. The fabrication line of claim 6 or 7,
   wherein the opening/closing device has an opening/closing shock absorber.

10. The fabrication line of claim 6 or 7,
    wherein an opening/closing detecting means for sensing an opening and closing position of the holding member is provided.

11. The fabrication line of claim 6 or 7,
    wherein a semifinished product detecting means for sensing the semifinished product mounted on the semifinished product supporting member is provided on the carriage member.

12. The fabrication line of claim 6 or 7,
    wherein a pallet-detecting member for sensing the jig pallet transported to a predetermined processing position of processing equipment in the fabrication line, and a positioning member to position the jig pallet are provided on the carriage member.

13. The fabrication line of claim 12,
wherein a fabrication control system for controlling fabrication with a signal sensing the pallet-detecting member is provided.

14. The fabrication line of claim 6 or 7,
wherein the semifinished product supporting member comprises legs and a receiving section, the receiving section having a fiber-reinforced plastic molding base material and a superficial layer made of polyurethane rubber.

* * * * *